Figure 1:
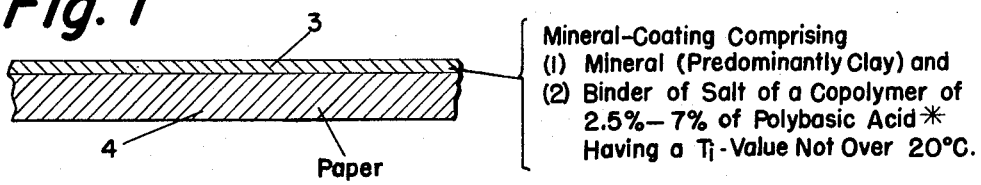

Mineral-Coating Comprising
(1) Mineral (Predominantly Clay) and
(2) Binder of Salt of a Copolymer of 2.5%–7% of Polybasic Acid✻ Having a $T_i$-Value Not Over 20°C.

✻Polybasic Acid May Be:
- Itaconic
- Aconitic
- Maleic
- Fumaric
- Dimer of Methacrylic
- Trimer of Methacrylic

United States Patent Office 2,790,736
Patented Apr. 30, 1957

2,790,736

METHODS OF MAKING COATED PAPER PRODUCTS AND THE PRODUCTS OBTAINED

Paul J. McLaughlin, Moorestown, N. J., Walter W. Toy, Philadelphia, Pa., and Theodore E. Bockstahler, Moorestown, N. J., assignors to Rohm & Haas Company, Philadelphia, Pa., a corporation of Delaware Application January 31, 1955, Serial No. 485,328

18 Claims. (Cl. 117—155)

This invention relates to mineral-coating compositions and to paper coated therewith. Mineral-coating compositions, such as are commonly applied to paper body stock in the manufacture of mineral-coated paper and the like, comprise aqueous suspensions of finely divided mineral matter, referred to herein as pigment, such as clay, calcium carbonate, blanc fixe, finely divided metals such as aluminum, color lakes, tinctorial oxides, or the like and an aqueous dispersion or solution of an adhesive such as casein, glue, starch, or the like.

In general, mineral coatings are applied to paper to improve the appearance, the printing qualities, or other properties of the paper. The mineral-coating covers the individual fibers of the paper surface and fills interstices between fibers, thus rendering the surface of the paper more level and more uniform in texture. It is primarily the pigment content of the coating composition which provides the desirable qualities of the coating, whereas the adhesive provides chiefly the function of suitably binding the mineral matter to the paper; e. g., so that it will not be removed by the pull of printing ink during the printing operation. Nevertheless, the particular adhesive used does have considerable influence upon the working qualities of the coating composition; e. g., viscosity, flow, spreadability, etc. Likewise the adhesive used in the coating composition has a definite effect upon the quality and appearance of the finished coated paper made therewith.

For example, the plasticity of the adhesive has a pronounced effect on the ability of the supercalender to produce a level and good printing surface.

It has heretofore been suggested to employ pigmented aqueous dispersions of such synthetic resinous polymers as polymerized methyl acrylate, ethyl acrylate, or butyl acrylate, or methyl, ethyl or butyl acrylate copolymerized with acrylonitrile or ethyl, methyl or butyl methacrylate. However, such polymers have been found to be insufficiently adherent to the paper to reliably resist being pulled up by the ink during printing operations.

A copending application, Serial No. 485,327 filed on even date herewith, discloses and claims coated papers obtained by the application of pigmented aqueous dispersions containing 8% to 25%, on the weight of the pigment, of copolymers of a lower alkyl acrylate with an acid, or salt thereof, selected from methacrylic and acrylic acids, which copolymers have a $T_i$ between $-45°$ C. and $20°$ C.

The $T_i$ value referred to is the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.$^2$.

The present invention is also based on the discovery that two factors are quite important in such polymers to provide good printing behavior. In the first place, the polymer must be soft enough to flow around the pigment particles and come into good conformity to the cellulose surface under the temperature conditions and in the very short time between application of the coating and drying thereof on the paper machine. This period is generally of the order of 30 to 45 seconds on conventional coating machines, such as the Champion type of coater, and the temperature ranges from $20°$ C. to $85°$ C. during such period. To provide this softness, the second order transition temperature, or $T_i$ as defined hereinabove, should not be over $20°$ C. It may range from about $-45°$ C. up and is preferably in the range of $-10°$ to $+10°$ C.

The second essential is to include in the copolymer a certain proportion of carboxylate groups (which may be designated —COOM-containing groups in which M represents H, an alkali metal, such as sodium, potassium, or lithium, the ammonium radical ($NH_4$) or the salt groups formed by a water-soluble amine, such as methylamine, ethylamine or any one of the ethanolamines, such as triethanolamine, to provide adhesiveness between the polymer and the paper surface. In the aforementioned application, copolymerization of 4% to 7% by weight of an acid, or salt thereof, selected from acrylic and methacrylic acids, served to provide this adhesiveness. When these acids are present in the copolymer, however, certain disadvantages are encountered. From the standpoint of cost, it is desirable to use clay as the predominant proportion of the pigment. When clay is used, it is necessary to adjust the pH of the coating dispersion to a value of 8.5 to 9.5 and preferably at least 9 to obtain the optimum dispersion of the clay in the system. When this is done with copolymers containing 4% to 5% of acrylic acid or methacrylic acid, the viscosity increases ten-to-twenty-fold when the pH is shifted from about 7 to about 9.0. Insufficient care in such adjustment gives rise to even higher viscosity increases if a pH of 9.0 is exceeded. In practice, the viscosity attained is so high even at pH values of 8.5 to 9.0 that extreme care is needed to effect proper coating of the paper. This viscosity increase is accentuated when polymers of preferred $T_i$ values not over $10°$ C. are used, when higher proportions of copolymer on the weight of pigment are employed, and especially when higher solids concentrations in the coating dispersion or suspension are used. It is particularly undesirable to reduce the difficulty by using lower solids concentrations since this requires greater drying capacities and consequent higher costs.

Figure 2:
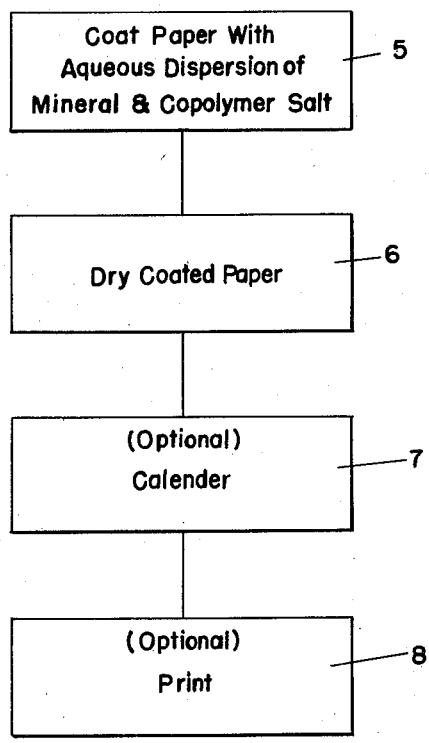

In the drawing, Fig. 1 is a diagrammatic cross-sectional view, much enlarged, of a coated paper of the present invention, and Fig. 2 is a flow diagram illustrating the process of coating paper in accordance with the present invention.

It is the primary object of the present invention to overcome the disadvantages of the acrylic acid and methacrylic acid copolymers just mentioned. It has been found that copolymers of certain monoethylenically unsaturated polybasic acids, or salts thereof of the type mentioned hereinabove, avoid the viscosity difficulties of, and have other advantages over, the copolymers of acrylic and methacrylic acid. These polybasic acids are itaconic acid, aconitic acid, maleic acid, fumaric acid the dimer of methacrylic acid and the trimer of methacrylic acid. The structure of the trimer has not as yet been established but the dimer has the structure of Formula I:

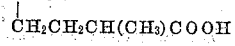

and is also known as α-methylene-delta-methyl-adipic acid.

It has been found that copolymers containing as little as 2.5% of any one or more of these polybasic acids provide marked adhesion to the paper and while as much as 7% may be present in the copolymer, the preferred proportions are from 2.5 or 3 to 5%. These copolymers show only viscosity increases on the order of 50% to 70% in changing from a pH of 7 to a pH of 9.0 even in solids concentrations of 60% to 70%. Such viscosity increases do not require the observance of any special precautions in the coating operation.

The amount of the binder in such coatings is from 8% to 25% by weight of the pigment, and is preferably 12% to 20% by weight thereof. In accordance with the present invention, the copolymers containing the polymerized acid or salt thereof generally constitutes the entire binder of the coating composition, though the copolymers may be combined with other binder materials provided the copolymers are used in predominating proportions. It is because of the low proportion of binder relative to pigment in these coating compositions that it is so important to have not only good flow of the copolymer but also specific adhesion to the paper which properties are obtained by the selection of $T_1$ values and the introduction of COOM groups in the copolymer.

The pigments that may be employed include clays, especially of the kaolin type, calcium carbonate, blanc fixe, talc, titanium dioxide, colored lakes and toners, ochre, carbon black, graphite, aluminum powder or flake, chrome yellow, molybdate orange, toluidine red, copper phthalocyanines, such as the "Monastral" blue and green lakes. The term "mineral" in the claims is intended to cover all such types of pigmentary matter whether of strict mineral character or partly of organic material.

Copolymers in accordance with the present invention include those obtained by the copolymerization of one or more of the lower alkyl acrylates in which the alkyl groups may have 1 to 4 carbon atoms with 2.5% to 7%, preferably 2.5% to 5%, by weight of an acid selected from the group consisting of itaconic acid, aconitic acid, maleic acid, fumaric acid, the dimer of, and the trimer of methacrylic acid, or a mixture of any of these acids.

The $T_1$ values of all such copolymers, namely those of the methyl, ethyl, propyl, and butyl acrylates are within the range specified to provide the softness required for the present invention. In fact, they are of such softness that substantial amounts of hardening comonomers may be introduced into such copolymers without causing the $T_1$ value to rise above the maximum permissible value of 20° C. Examples of such hardening comonomers include the lower alkyl methacrylates in which the alkyl group may have 1 to 4 carbons, namely the methyl, ethyl, propyl, and butyl methacrylates, styrene, acrylonitrile, methacrylonitrile, vinyl acetate, vinyl chloride, vinylidene chloride, and the like. The amount of hard comonomer that may be copolymerized with one of the soft monomers above depends upon the particular hard and soft comonomers to be copolymerized. The following list gives, for several typical copolymer systems, approximately the maximum amount of a particular hard comonomer that may be used with a particular soft comonomer to provide copolymers which have $T_1$ values of about 10° C. and lower. They are accordingly within the preferred range cited above and somewhat more of the hard comonomer could be used to provide copolymers which are still within the maximum scope of the invention as defined by the upper $T_1$ limit of 20° C. For example, a copolymer of 64% by weight of ethyl acrylate, 31% of methyl methacrylate, and 5% of itaconic acid and has a $T_1$ value of about 20° C. In the following list, "acid" refers to any one or mixture of the polybasic acids mentioned above:

Methyl acrylate 70, ethyl acrylate 25, acid 5
Ethyl acrylate 76, methyl methacrylate 19, acid 5
Ethyl acrylate 78, styrene 17, acid 5
Ethyl acrylate 78, acrylonitrile 17, acid 5
Ethyl acrylate 20, butyl methacrylate 75, acid 5
n-Propyl acrylate 62, methyl methacrylate 33, acid 5
n-Propyl acrylate 72, acrylonitrile 23, acid 5
Butyl acrylate 58, methyl methacrylate 37, acid 5
Butyl acrylate 68, acrylonitrile 27, acid 5
Butyl acrylate 10, butyl methacrylate 85, acid 5
Butyl acrylate 57, styrene 38, acid 5

The copolymer dispersions may be made by any of the known emulsion copolymerization procedures, e. g., by first mixing the several monomers in the desired proportions into an aqueous solution of an anionic, or preferably a non-ionic, dispersing or emulsifying agent.

Examples of anionic emulsifying agents that may be used include the higher fatty alcohol sulfates, such as sodium lauryl sulfate, the alkylaryl sulfonates, such as the sodium salt of t-octylphenyl sulfonate, the sodium dioctyl sulfosuccinates and so on. Examples of the non-ionic dispersing agents that may be used for preparing the monomeric emulsions before copolymerization or dispersions of the polymer after polymerization include the following: alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxythylene units, etc.; block copolymers of ethylene oxide and propylene oxide comprising a hydrophobic propylene oxide section combined with one or more hydrophilic ethylene oxide sections.

For the copolymerization, peroxidic free-radical catalysts, particularly catalytic systems of the redox type, are recommended. Such systems, as is well known, are combinations of oxidizing agents and reducing agents such as a combination of potassium persulfate and sodium metabisulfite. Other suitable peroxidic agents include the "per-salts" such as the alkali metal and ammonium persulfates and perborates, hydrogen peroxide, organic hydroperoxides such as tert-butyl hydroperoxide and cumene hydroperoxide, and esters such as tert-butyl perbenzoate. Other reducing agents include water-soluble thiosulfates and hydrosulfites. Activators or promoters in the form of the salts—such as the sulfates or chlorides—of metals which are capable of existing in more than one valence state such as cobalt, iron, nickel, and copper may be used in small amounts. The most convenient method of preparing the copolymer dispersions comprises agitating an aqueous suspension of a mixture of copolymerizable monomers and a redox catalytic combination at room temperature without the application of external heat. The amount of catalyst can vary but for purposes of efficiency from 0.01% to 1.0%, based on the weight of the monomers, of the peroxidic agent and the same or lower proportions of the reducing agent are recommended. In this way it is possible to prepare dispersions which contain as little as 1% and as much as 60% or 70% of the resinous copolymer on a weight basis. It is, however, more practical—hence preferred—to produce dispersions which contain about 30% to 50% resin-solids.

The pigment or pigments are preferably mixed and dispersed in a small amount of water before mixing with the copolymer dispersion. When clay is used as a part of the pigment, and in preferred embodiments it forms a predominant proportion of the pigment, the dispersion is preferably adjusted to a pH of 8.5 to 9.5 to obtain the optimum dispersion of the clay.

After combining the pigment and copolymer dispersions, the resulting coating composition is applied to the paper or paperboard at a total solids concentration of at least 40% and preferably 60% to 70% by any suitable equipment, such as immersion roll and doctor system, gravure roller system, brush coater, or spray coater. It may be applied to the paper after drying, and/or conditioning. Alternatively it may be applied during the first drying operation on the paper where it has undergone only partial drying. For example, the coating system may be mounted at an intermediate point in the drier on the paper-making machine, such as at a point where the paper has been reduced to approximately 50% moisture content.

After the coating operation, the coated sheet is dried and may then be calendered, and subsequently printed. The drying may be the usual type provided in which air at about 230° to 260° F. (110° to 130° C.) is directed against the paper for thirty to forty-five seconds. The paper and coating may reach a temperature of about 120° F. (ca. 85° C.) during the drying operation. Printing may be effected by the conventional inks of precipitation type or heat-setting type including those based on drying oils. The coated products of the present invention are receptive to single color inks and multicolor inks of graded viscosity and are able to withstand the pull of such inks. It may be overcoated, after printing, with wax, lacquer, or other compositions.

Fig. 1 shows a paper base 4 carrying a coating 3 on one surface thereof. The coating is obtained as illustrated in the flow diagram of Fig. 2 by applying to the sheet 4 (in step 5) an aqueous dispersion of the salt of a copolymer of one of the polybasic acids mentioned above which contains a pigment or mineral component which is predominantly clay, drying the coated paper (step 6), optionally calendering (step 7) and optionally printing (step 7).

In the following examples, which are illustrative of the present invention, the parts and percentages are by weight unless otherwise noted. The ink numbers referred to designate inks of the Institute of Printing having graded tackiness increasing from No. 1 to No. 6.

*Example 1*

Eighty parts of fine coating clay (kaolin), 20 parts of titanium dioxide, 0.2 part of sodium hexametaphosphate were mixed in 48 parts of water, and 0.2% (on the weight of clay) of sodium hydroxide was added to adjust the pH to 9. The mixture thus obtained was added to 25 parts of an aqueous dispersion of a copolymer having a $T_i$ of about −3° C. obtained by the emulsion copolymerization of a mixture of 87 parts of ethyl acrylate, 10.5 parts of methyl methacrylate, and 2.5 parts of itaconic acid in about 100 parts of water in the presence of 6 parts of a t-octylphenoxypolyethoxyethanol containing about thirty oxyethylene units, and a catalyst, such as small amounts of ammonium persulfate and sodium hydrosulfite. After polymerization, sodium hydroxide was added to adjust the composition to a pH of 9.

A dry chipboard (0.017 inch thick) was then coated with the composition (which contained 12% of copolymer on the weight of pigment) by means of a No. 12 wire-wound rod. About 5 to 6 pounds of the coating composition (dry weight) per 1000 sq. ft. of the board was thus applied to one surface. The coated board was dried in an oven by air heated at 185° F. for a period of 45 to 60 seconds. It was then calendered by rolls at room temperature at a pressure of 50 lbs./lineal inch. The coated board had a good, smooth surface highly receptive to ink and resistant to pick (that is removal) by inks having a tack corresponding to No. 5.

*Example 2*

The procedure of Example 1 was followed substituting for the copolymer there used a copolymer of 76% of butyl acrylate, 21.5% of acrylonitrile, and 2.5% of itaconic acid having a $T_i$ value of about −10° C. The coated board had similar resistance to pick during printing, no pick being encountered with a No. 5 ink.

*Example 3*

The procedure of Example 1 was followed substituting 2.5% of the methacrylic acid dimer for the 2.5% itaconic acid in the copolymer and raising the amount of copolymer on the weight of pigment from 12% to 20%. The coated board was essentially the same in qualities as that obtained in Example 1.

*Example 4*

The procedure of Example 1 was followed substituting 2.5% of aconitic acid for the 2.5% itaconic acid in the copolymer and raising the amount of copolymer on the weight of pigment from 12% to 20%. The coated board was essentially the same in qualities as that obtained in Example 1.

*Example 5*

The procedure of Example 1 was followed substituting for the copolymer there used, a copolymer of 70% of butyl acrylate, 27.5% of styrene, and 2.5% itaconic acid having a $T_i$ of about −5° C. Coated boards at this 12% copolymer on pigment ratio gave only a slight pick with a No. 5 ink.

When the amount of copolymer was reduced to 8% on the weight of pigment, a negligible pick was noted with a No. 3 ink. When 16% of copolymer on pigment was used, negligible pick occurred with a No. 5 ink and when 20% of copolymer on pigment was used, a negligible pick occurred with a No. 6 ink.

When the 2.5% of itaconic acid was replaced with 2.5% of the dimer of methacrylic acid, the coated boards had similar properties.

*Example 6*

The procedure of Example 1 was repeated substituting for the copolymer a copolymer of 80% of methyl acrylate, 15% of styrene and 5% of the trimer of methacrylic acid, and adjusting the pH with potassium hydroxide instead of sodium hydroxide. The coated board was similar to that of Example 1.

*Example 7*

The procedure of Example 1 was repeated substituting for the copolymer a copolymer of 70% of propyl acrylate, 25% of ethyl methacrylate and 5% of aconitic acid. Coated boards were similar to that of Example 1.

*Example 8*

The procedure of Example 1 was repeated substituting for the copolymer a copolymer of 15% of butyl acrylate, 82% of butyl methacrylate, and 3% of itaconic acid. The coated paperboard was similar to that of Example 1.

*Example 9*

The procedure of Example 1 was repeated substituting for the copolymer a copolymer of 96% of ethyl acrylate and 4% of itaconic acid. The coated paperboard was similar to that of Example 1.

*Example 10*

The procedure of Example 1 was repeated substituting for the copolymer a copolymer of 97.5% of methyl acrylate and 2.5% of itaconic acid having a $T_i$ of 17.5° C. The coated board was highly receptive to printing ink and resistant to pick by a No. 3 ink and picked only slightly with a No. 4 ink.

Example 11

The procedure of Example 1 was repeated substituting for the copolymer a copolymer of 85% of ethyl acrylate, 10% of methacrylonitrile, and 5% of itaconic acid and using ammonium hydroxide to adjust the pH to 9. The coated paperboard showed negligible pick with a No. 6 ink.

Example 12

The procedure of Example 1 is repeated substituting 2.5 parts of fumaric acid for the 2.5 parts of itaconic acid. The coated board showed a negligible pick with No. 4 ink.

Example 13

The procedure of Example 1 is repeated substituting for the copolymer thereof, a copolymer of 87 parts of ethyl acrylate, 6 parts of methyl methacrylate, and 7 parts of maleic anhydride. The coated board showed only a slight pick with a No. 4 ink.

In the claims, the term "paper" is intended to include not only thin flexible paper webs or sheets, but also board types made of paper fibers, whether flexible or stiff.

It is to be understood that changes and variations may be made without departing from the spirit and scope of the invention as defined by the appended claims.

We claim:

1. A mineral-coated paper product comprising a paper sheet carrying on a surface thereof a coating comprising (1) a finely divided pigmentary material having a predominant proportion of clay therein and (2) a binder comprising, for each 100 parts by weight of the pigment, from 8 to 25 parts by weight of a salt of a copolymer of at least one lower alkyl acrylate in which the alkyl group has from 1 to 4 carbon atoms with 2.5% to 7% by weight in the copolymer of at least one acid selected from the group consisting of itaconic acid, aconitic acid, maleic acid, fumaric acid, the dimer of, and the trimer of, methacrylic acid, said copolymer having a $T_1$ value not over 20° C.

2. A coated paper as defined in claim 1 in which the copolymer also comprises a hardening comonomer selected from the group consisting of a lower alkyl methacrylate in which the alkyl group has from 1 to 4 carbon atoms, styrene, acrylonitrile, methacrylonitrile, vinyl chloride, and vinylidene chloride.

3. A mineral-coated paper product comprising a paper sheet carrying on a surface thereof a coating comprising (1) a finely divided pigmentary material having a predominant proportion of clay therein and (2) a binder comprising, for each 100 parts by weight of the pigment, from 12 to 20 parts by weight of a salt of a copolymer of at least one lower alkyl acrylate in which the alkyl group has from 1 to 4 carbon atoms with 2.5% to 7% by weight in the copolymer of at least one acid selected from the group consisting of itaconic acid, aconitic acid, maleic acid, fumaric acid, the dimer of, and the trimer of, methacrylic acid, said copolymer having a $T_1$ value not over 20° C.

4. A mineral-coated paper product comprising a paper sheet carrying on a surface thereof a coating comprising (1) a finely divided pigmentary material having a predominant proportion of clay therein and (2) a binder comprising, for each 100 parts by weight of the pigment, from 8 to 25 parts by weight of a salt of a copolymer of at least one lower alkyl acrylate in which the alkyl group has from 1 to 4 carbon atoms with 2.5% to 7% by weight in the copolymer of at least one acid selected from the group consisting of itaconic acid, aconitic acid, maleic acid, fumaric acid, the dimer of, and the trimer of, methacrylic acid, said copolymer having a $T_1$ value between —45° C. and 20° C.

5. A mineral-coated paper product comprising a paper sheet carrying on a surface thereof a coating comprising (1) a finely divided pigmentary material having a predominant proportion of clay therein and (2) a binder comprising, for each 100 parts by weight of the pigment, from 8 to 25 parts by weight of a salt of a copolymer of at least one lower alkyl acrylate in which the alkyl group has from 1 to 4 carbon atoms with 2.5% to 7% by weight in the copolymer of at least one acid selected from the group consisting of itaconic acid, aconitic acid, maleic acid, fumaric acid, the dimer of, and the trimer of, methacrylic acid, said copolymer having a $T_1$ value between —10° C. and 10° C.

6. A mineral-coated paper product comprising a paper sheet carrying on a surface thereof a coating comprising (1) a finely divided pigmentary material having a predominant proportion of clay therein and (2) a binder comprising, for each 100 parts by weight of the pigment, from 8 to 25 parts by weight of an alkali metal salt of a copolymer of at least about 64% of ethyl acrylate, from 0 to 33.5% of methyl methacrylate, and 2.5% to 7% of itaconic acid, the copolymer having a $T_1$ value not over 20° C.

7. A mineral-coated paper product comprising a paper sheet carrying on a surface thereof a coating comprising (1) a finely divided pigmentary material having a predominant proportion of clay therein and (2) a binder comprising, for each 100 parts by weight of the pigment, from 8 to 25 parts by weight of an alkali metal salt of a copolymer of at least about 64% of ethyl acrylate, from 0 to 33.5% of methyl methacrylate, and 2.5% to 7% of the dimer of methacrylic acid, the copolymer having a $T_1$ value not over 20° C.

8. A mineral-coated paper product comprising a paper sheet carrying on a surface thereof a coating comprising (1) a finely divided pigmentary material having a predominant proportion of clay therein and (2) a binder comprising, for each 100 parts by weight of the pigment, from 8 to 25 parts by weight of an alkali metal salt of a copolymer of at least about 78% of ethyl acrylate, 0 to 19.5% of acrylonitrile and 2.5% to 7% of itaconic acid, the copolymer having a $T_1$ value not over 20° C.

9. A mineral-coated paper product comprising a paper sheet carrying on a surface thereof a coating comprising (1) a finely divided pigmentary material having a predominant proportion of clay therein and (2) a binder comprising, for each 100 parts by weight of the pigment, from 8 to 25 parts by weight of an alkali metal salt of a copolymer of at least about 78% of ethyl acrylate, 0 to 19.5% of styrene and 2.5% to 7% of itaconic acid, the copolymer having a $T_1$ value not over 20° C.

10. A mineral-coated paper product comprising a paper sheet carrying on a surface thereof a coating comprising (1) a finely divided pigmentary material having a predominant proportion of clay therein and (2) a binder comprising, for each 100 parts by weight of the pigment, from 8 to 25 parts by weight of an alkali metal salt of a copolymer of 87% of ethyl acrylate, 10.5% of methyl methacrylate and 2.5% of itaconic acid, the copolymer having a $T_1$ value not over 20° C.

11. A mineral-coated paper product comprising a paper sheet carrying on a surface thereof a coating comprising (1) a finely divided pigmentary material having a predominant proportion of clay therein and (2) a binder comprising, for each 100 parts by weight of the pigment, from 8 to 25 parts by weight of an alkali metal salt of a copolymer of 87% of ethyl acrylate, 10.5% of methyl methacrylate, and 2.5% of aconitic acid, the copolymer having a $T_1$ value not over 20° C.

12. A mineral-coated paper product comprising a paper sheet carrying on a surface thereof a coating comprising (1) a finely divided pigmentary material having a predominant proportion of clay therein and (2) a binder comprising, for each 100 parts by weight of the pigment, from 8 to 25 parts by weight of an alkali metal salt of a copolymer of 87% of ethyl acrylate, 10.5% of methyl methacrylate, and 2.5% of the dimer of methacrylic acid, the copolymer having a $T_1$ value not over 20° C.

13. A mineral-coated paper product comprising a paper sheet carrying on a surface thereof a coating comprising (1) a finely divided pigmentary material having a predominant proportion of clay therein and (2) a binder comprising, for each 100 parts by weight of the pigment, from 8 to 25 parts by weight of an alkali metal salt of a copolymer of 76% of butyl acrylate, 21.5% of acrylonitrile, and 2.5% of itaconic acid, the copolymer having a $T_1$ value not over 20° C.

14. A mineral-coated paper product comprising a paper sheet carrying on a surface thereof a coating comprising (1) a finely divided pigmentary material having a predominant proportion of clay therein and (2) a binder comprising, for each 100 parts by weight of the pigment, from 8 to 25 parts by weight of an alkali metal salt of a copolymer of 70% of butyl acrylate, 27.5% of styrene, and 2.5% of itaconic acid, a copolymer having a $T_1$ value not over 20° C.

15. A method of producing mineral-coated paper which comprises coating at least one side of a paper sheet with an aqueous dispersion of 40% to 70% total solids concentration, having a pH of 8.5 to 9.5, and containing a pigment comprising a predominant proportion of clay and 8% to 25%, on the total weight of pigment, of a salt of a copolymer of at least one lower alkyl acrylate in which the alkyl group has from 1 to 4 carbon atoms with 2.5% to 7% by weight in the copolymer of at least one acid selected from the group consisting of itaconic acid, aconitic acid, maleic acid, fumaric acid, the dimer of, and the trimer of, methacrylic acid, said copolymer having a $T_1$ value not over 20° C., drying, and calendering the coated sheet.

16. A method of producing mineral-coated paper which comprises coating at least one side of a paper sheet with an aqueous dispersion of 40% to 70% total solids concentration, having a pH of 8.5 to 9.5, and containing a pigment comprising a predominant proportion of clay and 12% to 20%, on the total weight of pigment, of a salt of a copolymer of at least one lower alkyl acrylate in which the alkyl group has from 1 to 4 carbon atoms with 2.5% to 7% by weight in the copolymer of at least one acid selected from the group consisting of itaconic acid, aconitic acid, maleic acid, fumaric acid, the dimer of, and the trimer of, methacrylic acid, said copolymer having a $T_1$ value not over 20° C., drying, and calendering the coated sheet.

17. A method of producing mineral-coated paper which comprises coating at least one side of a paper sheet with an aqueous dispersion of 40% to 70% total solids concentration, having a pH of 8.5 to 9.5, and containing a pigment comprising a predominant proportion of clay and 12% to 20%, on the total weight of pigment, of a salt of a copolymer of at least one lower alkyl acrylate in which the alkyl group has from 1 to 4 carbon atoms with 2.5% to 7% by weight in the copolymer of at least one acid selected from the group consisting of itaconic acid, aconitic acid, maleic acid, fumaric acid, the dimer of, and the trimer of, methacrylic acid, said copolymer having a $T_1$ value between −45° C. and 20° C., drying, and calendering the coated sheet.

18. A method of producing mineral-coated paper which comprises coating at least one side of a paper sheet with an aqueous dispersion of 40% to 70% total solids concentration, having a pH of 8.5 to 9.5, and containing a pigment comprising a predominant proportion of clay and 12% to 20%, on the total weight of pigment, of a salt of a copolymer of at least one lower alkyl acrylate in which the alkyl group has from 1 to 4 carbon atoms with 2.5% to 7% by weight in the copolymer of at least one acid selected from the group consisting of itaconic acid, aconitic acid, maleic acid, fumaric acid, the dimer of, and the trimer of, methacrylic acid, said copolymer having a $T_1$ value between −10° C. and 10° C., drying, and calendering the coated sheet.

References Cited in the file of this patent

UNITED STATES PATENTS

| | | |
|---|---|---|
| 2,577,624 | Niles | Dec. 4, 1951 |
| 2,583,274 | Niles | Jan. 22, 1952 |
| 2,661,308 | Azorlosa | Dec. 1, 1953 |
| 2,685,538 | Stinchfield | Aug. 3, 1954 |

OTHER REFERENCES

Modern Plastics, September 1947, pp. 128–129.

Ser. No. 337,664, Hooph (A. P. C.), published May 11, 1943.